United States Patent Office 3,462,242
Patented Aug. 19, 1969

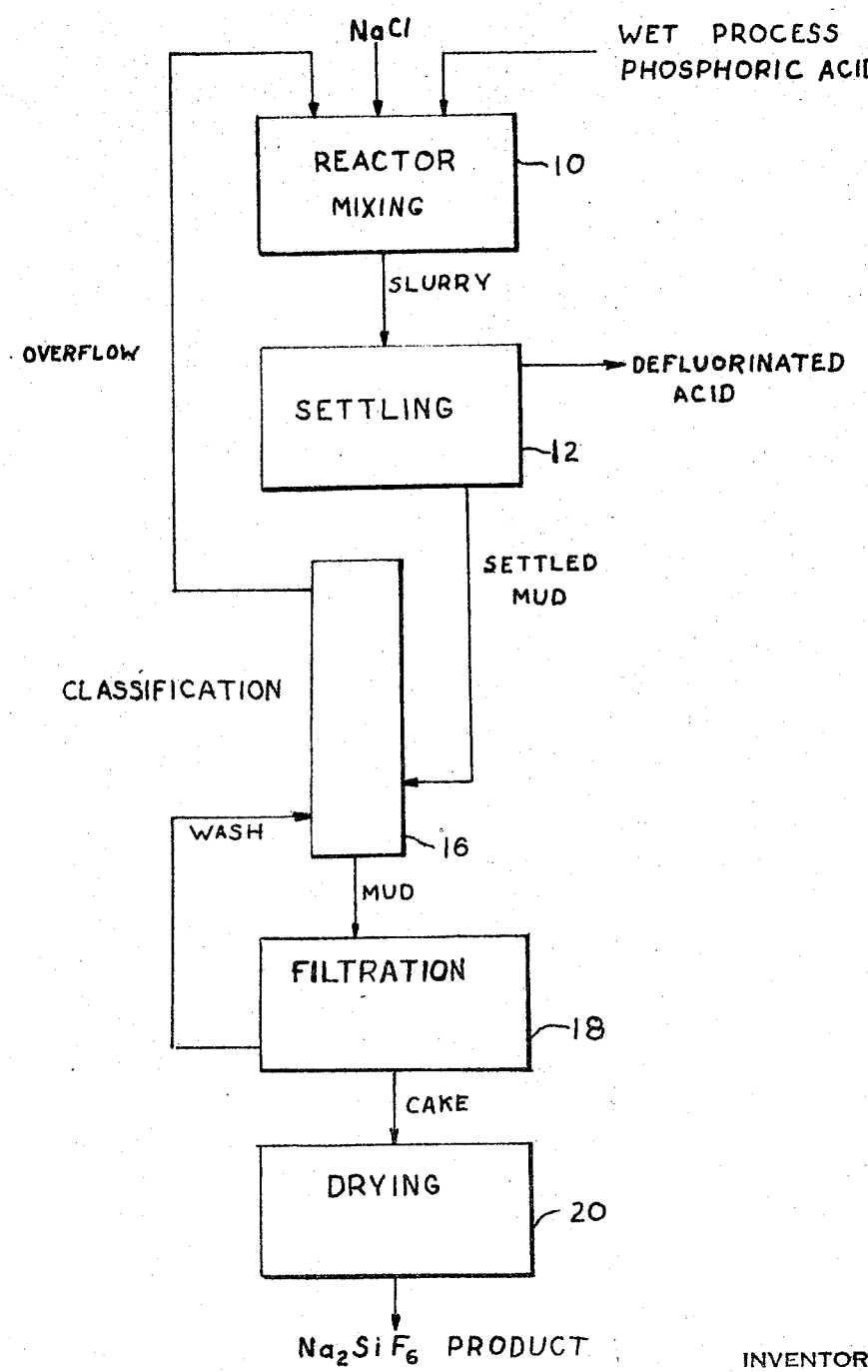

3,462,242
PROCESS FOR PRODUCING FLUOSILICATES
James E. Barker, East Point, and Julian H. Robinson, Lithia Springs, Ga., assignors to Tennessee Corporation, New York, N.Y., a corporation of Delaware
Filed July 26, 1967, Ser. No. 656,279
Int. Cl. C01b 33/08
U.S. Cl. 23—88          12 Claims

ABSTRACT OF THE DISCLOSURE

A process for the manufacture of commercially pure sodium fluosilicate from wet process phosphoric acid (WPA) by reacting a sodium salt preferably sodium chloride with the fluosilicic acid present in the phosphoric acid under conditions of moderate agitation characterized by a Reynolds number of between 7600 and 8300, thereby precipitating the sodium fluosilicate as a particle having a size between 200 mesh and 325 mesh. The reactant containing the precipitate is discharged as a slurry to a settling tank where the precipitate is settled out and the clarified defluorinated acid passed out in a separate stream for further processing. The settled mud is then passed to a classifier where gypsum and other solids are floated out in the wash, the wash as overflow being recycled to the mixing reactor. The classified sodium fluosilicate is filtered and dried to obtain a commercially pure sodium fluosilicate.

BACKGROUND OF THE INVENTION

This invention relates to a process for producing commercially pure sodium fluosilicate by defluorinating phosphoric acid produced by the acidulation of phosphate rock and similar fluoride containing phosphate materials. Sodium fluosilicate is used in the manufacture of vitreous enamels and opalescent glass as a coagulant for latex and in the fluoridation of drinking water, provided it meets requisite purity and size standards.

Wet process phosphoric acid (WPA) is produced by the acidulation of naturally occurring phosphate materials, such as phosphate rock which ordinarily contains about 4% by weight of combined fluorine. The presence of the fluorine in the phosphoric acid makes such acid unsuitable and undesirable for many purposes such as manufacture of high quality fertilizers or animal food supplements. Accordingly, it is necessary to defluorinate such wet process phosphoric acid before it can be used in manufacturing fertilizers and animal food supplements.

A number of processes for defluorinating the phosphoric acid have been developed and include precipitation and filtration of the fluorides, steam or air stripping of the fluorides and simple concentration of the acid in the course of which the volatile fluorides are evolved. All these prior art defluorination processes are expensive or wasteful of phosphorous or both. In the present practice about half the fluorine is volatilized as $SiF_4$ by concentrating the primary acid to the final merchant grade. This $SiF_4$ is collected and converted to fluosilicic acid by scrubbing the volatized gases with water. The resulting dilute fluosilicic acid is reacted with an alkali metal or alkali earth salt or hydroxide to form a fluosilicic salt precipitate which is recovered by filtration, and washed and dried. This process is inefficient in that only about half of the fluorine is recovered and that the scrubbers required to prevent excessive air pollution are expensive and complicated. Alternate methods proposed are the addition of an alkali metal hydroxide to primary acid to precipitate the alkali metal fluosilicate. However, in the latter method, the resulting alkali fluosilicate is contaminated with gypsum and other insoluble materials from the acid, and requires subsequent purification by digesting the soluble materials with fluosilicic acid as outlined in U.S. Patent 3,055,733. Additionally, in practicing the ordinary alkali precipitation of the fluorine from the wet process phosphoric acid, the acid is neutralized to a considerable extent producing unwanted sodium phosphate. To keep the formation of sodium phosphate down to a minimum, an amount of alkali is added to the wet process phosphoric acid in quantities sufficient to precipitate substantially all the fluosilicate. This precipitate as obtained by prior art techniques is unsatisfactory because it is extremely difficult to separate from the acid as it is extremely gelatinous and has a low rate of crystal growth and a slow settling rate.

SUMMARY OF THE INVENTION

We have discovered that sodium fluosilicate can be separated from the other insoluble materials obtained by the reaction of a sodium salt, preferably sodium chloride, with a fluosilicate containing phosphoric acid, by agitating the salt and acid reactants at lower than normal mixing conditions characterized by a Reynolds number between about 7600 and 8300 whereby the sodium fluosilicate is precipitated in such a manner that the crystals are both larger than 325 mesh and readily separable from any included impurities. Where more severe agitation characterized by a Reynolds number higher than 8300 is used, the particles tend to be smaller than 325 mesh and a gelling with other precipitated material takes place. Agitation characterized by a Reynolds number lower than 7600 is insufficient to obtain satisfactory crystal size formation. In a particular embodiment, the process comprises the steps of adding sodium salt to wet process phosphoric acid containing fluosilicates under the aforesaid agitation to precipitate sodium fluosilicate having a crystal size between about 200 mesh and 325 mesh, separating the precipitate from the liquor by clarification, removing insoluble materials other than sodium fluosilicate from the precipitate by water classification and filtering and drying the sodium fluosilicate.

Therefore, it is an object of this invention to provide a process for the production of commercially pure sodium fluosilicates.

It is another object of this invention to provide an efficient, inexpensive process for removing fluorides from wet process phosphoric acid.

Other objects and advantages of the process of this invention will become apparent from the description of the preferred embodiments and examples which follow:

Brief description of the drawings

The drawing is a flow diagram showing the process of this invention.

Brief description of preferred embodiments

Referring to the drawing, wet process phosphoric acid is fed from a source not shown into a reactor 10 together with sodium chloride from a separate source also not shown. While sodium chloride is preferred, other salts or bases such as sodium carbonate, phosphate and sulfate or sodium hydroxide are contemplated on an equivalent sodium basis.

The sodium chloride is added either as a solid crystal or as an aqueous solution to the liquid reactant in the reactor while the reactant is continually but moderately agitated, stirred, or mixed by conventional means provided that the agitation is characterized by a Reynolds number of from about 7600 to about 8300.

Such mixing is neither fully turbulent nor laminar, as fully turbulent mixing is characterized by a Reynolds number greater than about 10,000 and laminar mixing is characterized by a Reynolds number below 10. Most mixing is performed in the fully turbulent-range and as such is neither characteristic of the present invention, nor would the same results be obtained. The Reynolds number may be determined utilizing the equation:

$$N_{Re} = NDa^2 P/U$$

where N is the mixing impellers speed, Da is the impeller diameter, P is the fluid density, and U is the absolute viscosity.

Any conventional mixing apparatus may be used provided the mixer speed is controlled to obtain the specified mixing characterized by a Reynolds number between 7600 and 8300 as defined by the above equation. Where the agitation is characterized by a Reynolds number below 7600, there is insufficient and inadequate mixing of the reactants. Alternatively, where the agitation is above about that characterized by a Reynolds number of 8300, it was found that the particle size was smaller than 325 mesh and that other precipitated impurities tended to cause difficulty during subsequent separation and additionally slowed the settling rate. This is so since the precipitate when mixed at a more severe rate is extremely gelatinous and tends to trap foreign material or gangue, so that it is extremely difficult to filter and purify.

The temperature maintained during mixing is generally in the range of from about 100° F. to about 200° F., with a range of from about 140° F. to about 160° F. being preferred. The mixture is retained in the reactor 10 for a period of from about 5 minutes to about 30 minutes. The longer periods are used where a lower mixing temperature is employed and in those instances where sodium phosphate is present in the reactor.

Commercially pure sodium chloride NaCl either as solid or as brine is added to the impure wet process phosphoric acid from about 50% of the stoichiometrical amount to about 150% of that amount, though an amount of salt equivalent to from about 100% to about 150% of the stoichiometrical amount based upon the fluosilicates present is preferred.

The resultant slurry containing precipitated sodium fluosilicate is passed from the reactor 10 to a settling tank 12 and retained for a period of from 15 to 60 minutes, 15 minutes being preferred, where the sodium fluosilicate precipitate is caused to settle in the tank 12 while the clarified liquor consisting of substantially defluorinated wet process phosphoric acid supernatant is drawn off for subsequent treatment. The volume and cross-sectional area of the settling tank are selected to be sufficient to achieve a separation of the sodium fluosilicate precipitate at the settling velocity over the desired period of time. The defluorinated phosphoric acid supernatant liquid is removed from the tank for further processing such as the manufacture of fertilizers.

The settled mud is passed to a classifier 16 where it is treated with an aqueous liquor as a wash. Wet classification is generally defined as the separating of solid particles in a mixture of solids, such as the settled mud, into fractions according to particle size or density by methods other than screening. In general, the two products are a partially drained fraction containing the coarse material and a fine fraction along with the liquid medium designated as overflow. The coarse material in this instance is the sodium fluosilicate while gypsum and other impurities are the fine fraction which is floated out in the wash liquor as part of the overflow. In an illustrative embodiment a chromatograph column is used as the classifier and wash liquor is supplied at the column bottom to obtain a sufficient upward flow velocity in the column to separate the sodium fluosilicate from the other solid impurities.

The overflow from the classifier 16 is recycled back to the reactor 10. The sodium fluosilicate mud from the classifier is passed to a filter 18 where it is separated out as a filter cake and filtrate is recycled back to the classifier to serve as the wash liquor. Additional water is added as make-up to the classified sodium fluosilicate mud during filtration to provide sufficient filtrate to act as wash liquor.

The filter cake is dried in a dryer 20 and removed as the commercially pure sodium fluosilicate product.

Up to 85% of the total fluorine in the wet process phosphoric acid can be recovered as sodium fluosilicate. This represents a 99+% recovery of available fluosilicate as the remaining fluorine is present in an unrecoverable aluminum difluoride complex $AlF_2+$. The aluminum difluoride complex remains in solution in the defluorinated phosphoric acid supernatant which is separated from the settled sodium fluosilicate mud.

In order to further describe the invention and without any intention of being limited thereto, the following examples are given:

Example 1

Two thousand pounds (2,000 lbs.) of wet process phosphoric acid, comprising by weight 29% $P_2O_5$, 2.4% F and 68.6% water was fed into the reactor simultaneously with 63.6 lbs. of salt (NaCl) and 219.5 lbs. of recycled overflow wash liquor from the classifier, all the while being subject to a mixing characterized by a Reynolds number between 7600 and 8300. In the settling tank, the reaction product was retained for a period of about 15 minutes exhibiting a settling rate of 6 inch/minute and yielding 2103 lbs. of defluorinated phosphoric acid, and 180 lbs. of settled mud. The defluorinated phosphoric acid analyzed as follows by weight:

| | Percent |
|---|---|
| $P_2O_5$ | 27.6 |
| F | 0.57 |
| HCl | 1.06 |
| NaCl | 1.27 |
| $H_2O$ | 69.5 |

The settled mud analyzed as follows:

| | Percent |
|---|---|
| $Na_2SiF_6$ | 35 |
| $P_2O_5$ | 17.9 |
| HCl | 0.7 |
| NaCl | 0.8 |
| $H_2O$ | 45.2 |
| Insol. including gypsum | 0.1 |

The settled mud was passed into a chromatography column acting as the classifier with about 173 lbs. of wash liquor supplied at the column bottom having a 3 in./minute flow at the ratio of 4 lbs. wash per lb. of sodium fluosilicate ($Na_2SiF_6$). At the conclusion of classification the classified mud was composed of 132 lbs. of the following by weight:

| | Percent |
|---|---|
| $Na_2SiF_6$ | 45 |
| $P_2O_5$ (soluble) | 4.9 |
| HCl | 0.2 |
| NaCl | 0.2 |
| $H_2O$ | 49.6 |
| Insolubles | 0.005 |

The overflow from the classifier was recycled as shown in the drawing to the reactor. The classified mud was passed through the filter at the rate of 1600 gal./hr./ft.² under 15″ Hg vacuum. The filtrate was recycled to the classifier as wash liquor while the filter cake was passed through a dryer and resulted in 59.4 lbs. of sodium fluosilicate of 99.4% purity.

Example 2

The recovery of fluosilicate as the commercially pure sodium fluosilicate shown above is dependent on the proportion of salt added to the wet process phosphoric acid. This is indicated by the various tests utilizing the process as described in Example 1 but varying the quantity of salt (NaCl) added. Results are summarized in the following table:

| NaCl percent of stoichiometric requirement | Percent SiF$_4$ recovery | WPA, analysis | |
|---|---|---|---|
| | | F (percent) | Na (percent) |
| 66.7 | 71.5 | 0.99 | 0.090 |
| 77.4 | 82.4 | 0.78 | 0.110 |
| 87.9 | 88.6 | 0.62 | 0.131 |
| 98.6 | 94.9 | 0.48 | 0.206 |
| 110.9 | 99.9 | 0.37 | 0.2:6 |

Having fully described the invention and desiring to cover the spirit and scope of this invention as would be apparent to those skilled in the art;

We claim:

1. A method for producing sodium fluosilicate from impure phosphoric acid containing fluorides and silicates comprising:
   (a) feeding the impure phosphoric acid and a sodium compound into a reaction vessel;
   (b) agitating the impure phosphoric acid and the sodium compound under mixing conditions characterized by a Reynolds number of from about 7600 to about 8300 in order to obtain a sodium fluosilicate particulate precipitate characterized by a particle size larger than 325 mesh slurried in a phosphoric acid liquor; and
   (c) separating the sodium fluosilicate precipitate from the phosphoric acid liquor.

2. The process of claim 1 wherein the sodium compound is selected from the group consisting of sodium chloride, sodium carbonate, sodium sulfate, sodium phosphate, and sodium hydroxide.

3. The process of claim 1 wherein the sodium compound is sodium chloride.

4. A method for producing sodium fluosilicate from impure phosphoric acid containing fluorides and silicates comprising:
   feeding the impure phosphoric acid and a sodium compound into a reaction vessel;
   agitating the impure phosphoric acid and the sodium compound under mixing condition characterized by a Reynolds number of from 7600 to about 8300 in order to obtain a sodium fluosilicate particulate precipitate characterized by a particle size between 325 mesh and 200 mesh slurried in a phosphoric acid liquor;
   clarifing the phosphoric acid liquor and the sodium fluosilicate precipitate by allowing the precipitate to settle as sodium fluosilicate mud while removing the supernatant phosphoric acid liquor;
   classifying the settled sodium fluosilicate mud with aqueous wash liquor to remove solid impurities in an overflow and obtain a purified sodium fluosilicate; and
   filtering the classified sodium fluosilicate in order to obtain a sodium fluosilicate cake and a filtrate.

5. The process of claim 4 which additionally comprises the step of drying the sodium fluosilicate cake.

6. The process of claim 4 which additionally comprises;
   (a) recycling the filtrate to use as the classifying wash liquor;
   (b) removing the overflow from the classification step; and
   (c) feeding the overflow into the reactor with the compound and the impure phosphoric acid.

7. The process of claim 4 wherein the reaction is maintained for about 5 minutes at a temperature of from about 140° F. to about 180° F.

8. The process of claim 5 wherein the step of clarification comprises, feeding the reaction mixture to a settling tank and retaining the mixture in the tank for at least 15 minutes.

9. The process of claim 4 wherein the sodium compound is selected from the group consisting of sodium chloride, sodium carbonate, sodium sulfate, sodium phosphate, and sodium hydroxide.

10. The process of claim 4 wherein the sodium compound is sodium chloride.

11. The process of claim 1 wherein said step of agitating the impure phosphoric acid and the sodium compound produces a sodium fluosilicate particulate precipitate characterized by a particle size between 325 mesh and 200 mesh.

12. The process of claim 11 wherein the agitation is maintained between about 5 and 30 minutes at a temperature of from about 100° F. to about 200° F.

References Cited

UNITED STATES PATENTS

| 1,247,165 | 11/1917 | Stahl | 23—88 |
| 2,865,709 | 12/1958 | Horn et al. | 23—88 |
| 2,883,266 | 4/1959 | Hodges et al. | 23—88 |
| 3,099,622 | 7/1963 | Woerther | 23—88 |

OTHER REFERENCES

Chemical Engineers' Handbook, 1963 ed., pages 50 and 51 of section 21. John H. Perry, editor, 4th ed., McGraw-Hill Book Co., New York.

EDWARD STERN, Primary Examiner

U.S. Cl. X.R.

23—165